Figure 1:
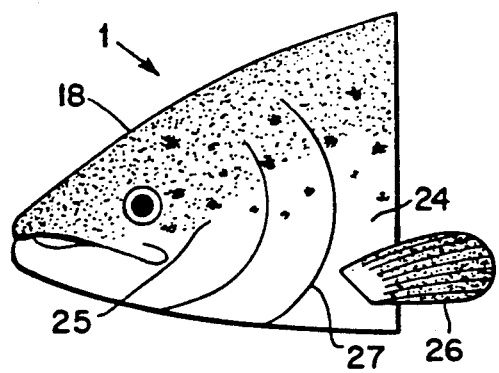

United States Patent [19]

Kristinsson

[11] Patent Number: 5,106,334

[45] Date of Patent: Apr. 21, 1992

[54] MACHINE FOR REMOVING HEADBONE, SPINE, GILLS AND ORGANS FROM A FRONT PART OF A FISH

[75] Inventor: Sigurdur Kristinsson, Reykjavik, Iceland

[73] Assignee: Jonatan HF, Reykjavik, Iceland

[21] Appl. No.: 716,738

[22] Filed: Jun. 18, 1991

[30] Foreign Application Priority Data

Jun. 22, 1990 [IS] Iceland ........................................ 3597

[51] Int. Cl.5 ............................................. A22B 25/14
[52] U.S. Cl. ..................................... 452/106; 452/108; 452/160; 452/165
[58] Field of Search ............... 452/106, 108, 160, 161, 452/162, 165, 118

[56] References Cited

U.S. PATENT DOCUMENTS 1,571,169  1/1926  Keller ................................... 452/118
4,748,721  6/1988  Braeger ................................ 452/162

FOREIGN PATENT DOCUMENTS 269999  7/1989  Fed. Rep. of Germany ...... 452/108

Primary Examiner—Willis Little
Attorney, Agent, or Firm—Nies, Kurz, Bergert and Tamburro

[57] ABSTRACT

The invention includes a method and a machine for removing spine 2, headbone 13 and organs 4, 5, 6 and 10 from a front part 1 of a fish "parting" of the fish into two parts, rear part and front part 1, where the pectoral nose 9 is uncut, and the pectoral bond 20 is uncut, and the belly cut 39 does not separate the lower end of the pectoral bones 19. The method includes moving, by means of a spiked chain at each side, the front part 1 with the belly 3 at front and the head 18 at rear along a fixed straight track 21 to a fixed U-formed beam comprising a belly scraper 16 at the end of the spiked chains 23. The belly 3 is threaded upon the belly scraper 16, which scrapes the inside of the belly 3, so that the organs get loose from the front part 1 and are moved into the belly scraper 16.

At front of the belly scraper 16 is a gill knife 17, which cuts the lower ends of the gills 10 from the radix of the tongue 8. Below the belly scraper 16 the belly board 22, supports the belly 40, while the belly scraper removes the organs 4, 5, 6 and gills 10. Next the front part 1 passes two knives 14, which cut the spine 2 and the headbone 13 from the front part 1. 14 reaching into the belly 3, throat 5. The spine 2 and the headbone 13 are moved by a spike chain 30 along the belly scraper 16 to its end. The pectoral bones 19 adjacent to the belly flaps 24 fall together with the cheeks 25 down into a tub 32 below for material for jam.

12 Claims, 3 Drawing Sheets

MACHINE FOR REMOVING HEADBONE, SPINE, GILLS AND ORGANS FROM A FRONT PART OF A FISH

THE FISH

There are different methods for removing the head from a fish, depending on whether the fish is alive or dead and for which process it is intended. This invention only regards a front part 1 having organs 4, 5 and 6 in the belly 3 and regards their removal together with the removal of the gills 10, headbone 13 and spine 2 from the cheeks 25 and belly flaps 24.

Fishes, which have been caught, are cut in different ways, these cuts are limiting the possible processes of the parts. The most important cuts are the pectoral nose 9 cut and the pectoral bond 20 cut. The pectoral nose 9 is the muscle beneath the throat of the fish, which connects the pectoral bones 19 to the head 18 or to the radix of the tongue 8. Behind this pectoral nose 9 are the arteries between the heart 4 and the gills 10, and they are cut by a cut through the pectoral nose 9. Seafishes are most often killed by a cut through the pectoral nose. Whole, fresh salmon for consumption is, because of appearance, not killed in this way but by a cut through the middle of one of the gills 10. The second most important cut is the cut through the pectoral bond 20. That cut opens the belly 3 all the way and makes the removal of the intestines easier, and it is performed, when appearance does not matter. On cod and haddock the pectoral nose 9 is cut for killing and the pectoral bond cut for making the removal of the intestines from the belly easier. Machines for processing front part, for example of cod, where the pectoral nose 9 and the pectoral bond 20 have been cut, are not qualified for processing of a front part 1, where the pectoral nose 9 and the pectoral bond 20 are whole.

The difference between a head and a front part for removal of waste is firstly, that the front part 1 has a whole pectoral bond, which prevents the removal of the gills by known methods and tools. Secondly the front part 11 includes organs 4, 5 and 6 in the belly, which must be separated from the cheeks 25 and the belly flaps 24. Thirdly the front part 1 includes the belly flaps 24, which are raw material for jam and which are to be separated from bones and organs.

KNOWN REMOVAL OF GILLS

There are known machines for removing gills 10 from a head 18, where the pectoral bones 19 are either missing or the pectoral nose 9 and the pectoral bone 20 has been cut. There the "pectoral circle" is not present. In that case the mouth is slipped upon a hollow shaft. Out from the shaft there are expelled two beams in front of the gills, retaining the gills 10 and tearing the gills 10 from the head 18, when the head is moved forwards along the track 21. This method and this equipment is inapplicable, if the pectoral bond 20 is whole. In that case the pectoral bones and the pectoral bond, together with the head above, form a circle around the shaft, a pectoral circle. If the circle remains whole and is separated above and beneath, the belly flaps will belong to the gills into waste. If the circle remains whole and is separated above, the gills will belong to the belly flaps. If the circle is separated beneath, the pectoral bond breaks, the belly flaps will belong to the spine into waste. Anyhow the organs 4, 5, and 6 would not be separated from the belly flaps 24. Then the purpose is not obtained, to separate the gills 10 and other organs from the belly flaps 24. Therefore the machine would be inapplicable. This results in that it is quite difficult to remove gills from a front part 1 having a whole pectoral bond 20 and to remove gills from a head 18 without pectoral bones 19 or with cut pectoral bond 20. In that case there is no "pectoral circle" present. Present invention relates to processing a head 18 with gills 10, pectoral bones 19, belly flaps 24 and whole pectoral bond 20, the socalled front part 1 FIGS. 1 and 2.

KNOWN REMOVAL OF HEADBONE

Known machines cut the headbone 13 from a common head 18 without pectoral bones 19, by means of two cuts into the throat 3, usually through the eyes. These cuts are known per se, but they do not serve the present purpose, to separate the organs 4, 5, 6 and 10, headbone 13 and spine 2 from the front part 1, because they would leave the organs belonging to cheeks and belly flaps. Therefor it does not serve any purpose to cut the headbone 13 and the spine 2 from the front part.

KNOW MACHINE UNIT

The removal of the gills and the removal of the headbone is usually performed by the same machine unit, which tears the gills 10 and cuts the headbone 13 from a head 18, which is with gills and without or with pectoral bones 19 but never with uncut pectoral bond 20. In this case the head 18 is in upright position and the mouth 15 of the head is opened wide apart and slipped upon a cantilevered, hollow (not U-formed) beam and moved forward by a vertical spiked chain, first to the gill removing beams and then to inclining rotating knives, each powered by its own motor and respective shaft.

Therefore it is known per se to cut the headbone from the head and tear off the gills. These machines are able to process a fishhead but not a front part. These machines do not serve the purpose of the present invention.

PROCESSING OF A FRONT PART

In the processing of salmon, trout, redfish and some other species of fish, the first step of the process is to cut the fish in two parts by a cut behind the pectoral bone and pectoral fin. In this way a front part and a rear part are formed. This is called "parting". The rear part is cut into flitches, whereas the nape muscles belong to the front part into waste.

A new invention, disclosed in companion U.S. application Ser. No. 714,898, filed Jun. 17, 1991, of the present inventor includes a machine for removing the nape muscle 7 from the front part 1, before the headbone 13 and the spine 2 are removed, by a machine according to present invention. That specification describes general processing of fish and cuts into the flesh of the fish, and a reference to that description is preferred. Cuts into the head 18 and the front part 1 are explained above.

THE INVENTION

The purpose of the invention is to separate the organs 4, 5, and 6, gills 10, headbone 13 and spine 2 from the cheeks 25 and belly flaps 24. That purpose is according to the invention obtained by a U-formed kind of a slide, called belly scraper 16.

The belly scraper 16 separates the organs 4, 5, and 6, and the gills 10 from the cheeks 25 and the belly flaps 24, before the headbone 13 is cut loose.

In addition to the belly scraper 16, which forms the slide, the knife 17 and the knives 14, a machine according to the invention includes a transport track 21, along which the front part is moved by spiked chains 23, which are operating horizontal. After the cut 14 the front part 1 is moved forward along the slide of the belly scraper 16 by means of a spiked chain 29, which is operating between the knives 14.

To adapt to different sizes of front parts, the spiked chain 29 of the headbone 13 is elastically movable up and down. The spike chain 29 is fixed on a horizontal axle in front of the knives 14 and can oscillate around it for obtaining elastic motion up and down aboved the track. The invention will now be described further by means of following figures.

FIGURES

FIG. 1 illustrates from one side a front part 1 with a head 18, belly flaps 24, cheeks 25 pectoral fin 26 and gill slit 27.

Figure 2:
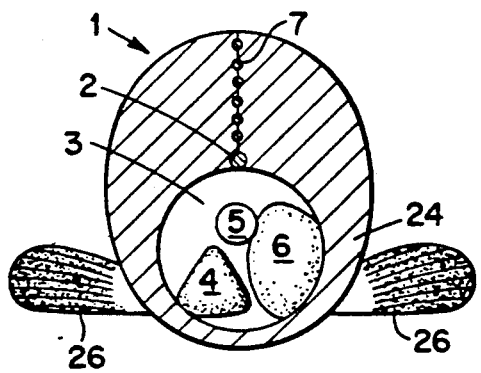

FIG. 2 illustrates a front part 1 seen from behind. Under the spine 2 with the spinal crest 7 is the belly 3 including the heart 4, liver 6 and the stomach opening 5. The belly flaps 24 with the pectoral fins 26 are also illustrated.

Figure 3:
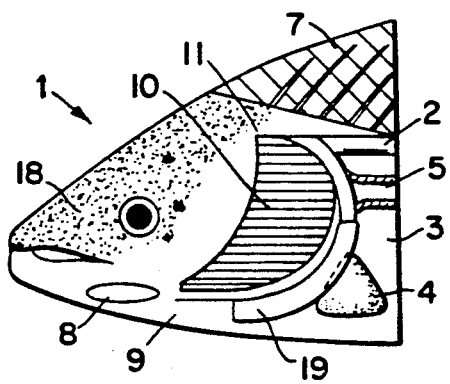

FIG. 3 illustrates a front part seen from one side, where the surface has been removed. The nape muscle has been removed, the spinal crest can be seen. Backwards from the head extends the spine 2. Farthest back on the head 18 is the upper joint 11 of the gills 10. The lower joint of the gills is at the radix of the tongue 8. Behind the radix of the tongue 8 is the pectoral nose 9, which connects the pectoral bones 19 and the belly flaps 24 to the head 18. The figure further illustrates the belly 3, the heart 4 and the stomach opening 5.

Figure 4:
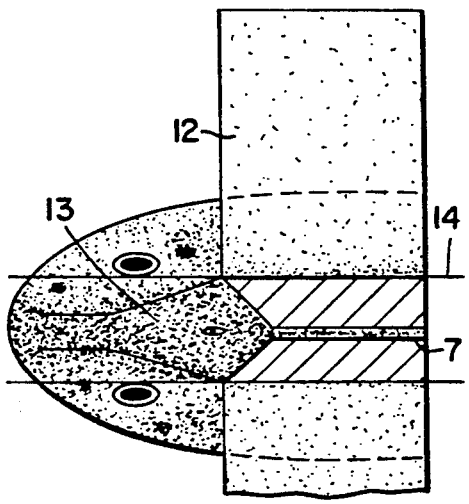

FIG. 4 illustrates from above the front part 1, where the nape muscle has been removed by a respective machine invented by the present inventor according to Iceland application nr. 3596, and the aforesaid U.S. application Ser. No. 714,898. The figure illustrates the headbone 13, spinal crest 7 and the skin 12. The invention includes cutting two cuts 14 which separate headbone 13, spine 2, gills and organs 4 and 6 from other parts of the front part 1, thus separating raw material for jam. The gills 10 are joined to the head 18 by the upper joint 11. Cuts at each side of the headbone 13 are known per se, but those cuts do not simultaneously separate gills 10 and organs 4, 5 and 6 from cheeks 25 and belly flaps 24. That purpose is served by an U-formed belly scraper 16, inside the mouth and belly, when the cuts 14 are performed. The U-formed belly scraper 16 separates the gills 10 and the organs 4,5 and 6 from the chins 25 and belly flaps 24, before the cuts are performed, and as the gills are joined into the head 13 by the joints 11, they belong to the headbone 13 and the spine 2.

Figure 5:
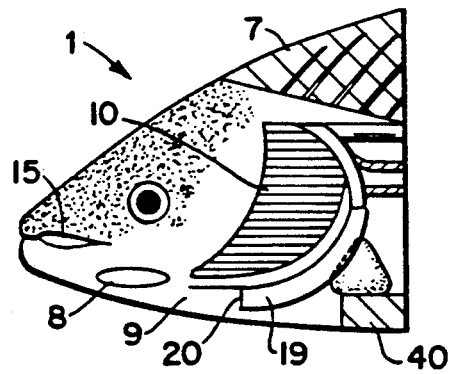

FIG. 5 illustrates the mouth 15, the radix of the tongue 8, which is connected to the pectoral nose 9 and the lower end of the gills 10. Behind the pectoral nose 9 there are the pectoral bones 19, which are connected together by the pectoral bond 20. The belly 40 is sometimes cut for removing the intestines.

Figure 6:
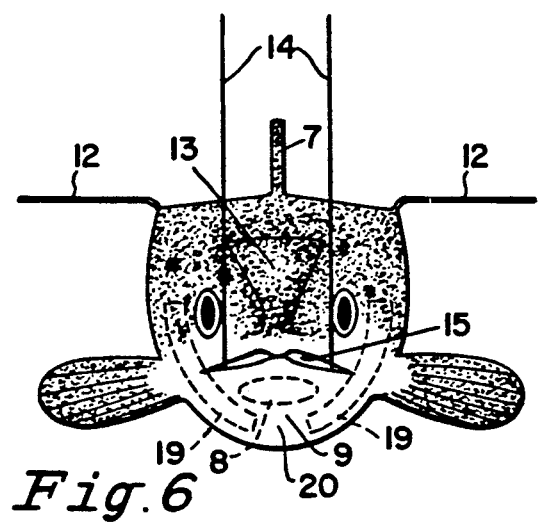

FIG. 6 illustrates in front view a front part 1, wherein the nape muscle has been removed. The skin has been placed sidewards. The headbone 13 is below the spinal crest 7, and at each side of it the cuts 14 reach downwards into the mouth 15. Under the tongue 8 the pectoral bones 19 can be seen and between them is the pectoral bond 20 and in front of that is the pectoral nose 9 connected to the radix of the tongue 8.

Figure 7:
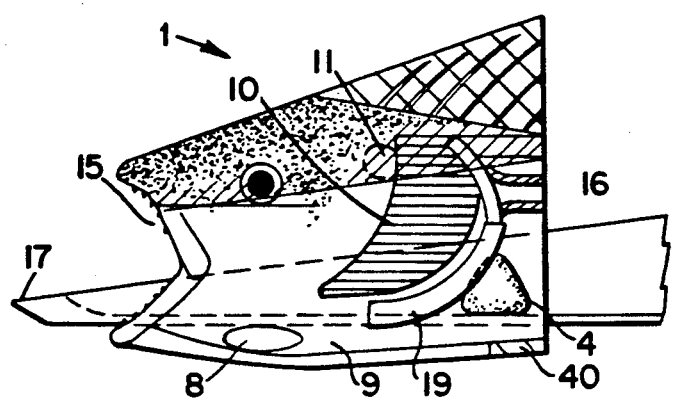

FIG. 7 illustrates from one side the mouth 15 wide open as its is, when the head has reached the knives 14. The knife 17 cuts the gills 10 from the radix of the tongue 8, so that they are only joined to the head by the upper joint 11, the gills are moved along the slit of the belly scraper 16 and are pushing forwards the organs 4, 5 and 6, which are in the slit. The knives 14 cut the cheeks 25 and the belly flaps 24 free, and they fall down into a tub 32 for jam material.

Figure 8:
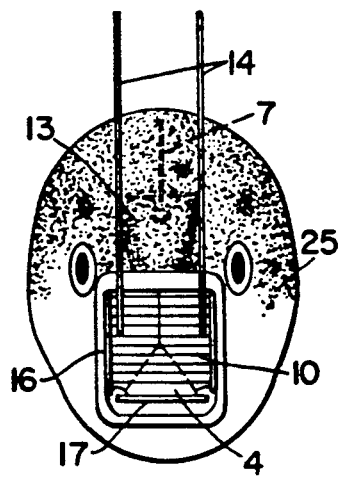

FIG. 8 illustrates a front part 1 in front view, when the knife 17 has cut the lower joints of the gills 10. The spinal crest 7, the spine 2, headbone 13, organs 4, 5 and 6 and the gills 10 are in the slide 16 and are moved along it, and the front part 1 has arrived to he knives 14. After the cut of the knives 14, the cheeks 25 and the belly flaps 24 fall down into a tub for material for jam, which is below.

Figure 9:
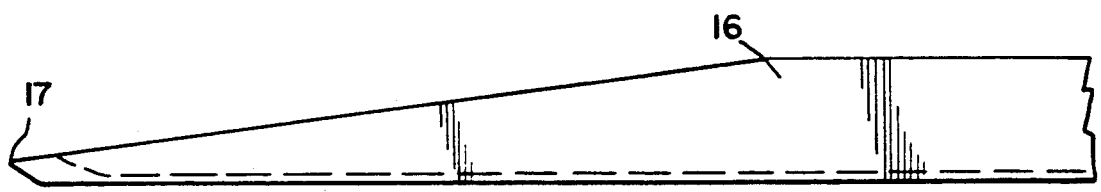

FIG. 9 illustrates the belly scraper 16 seen from one side.

Figure 10:
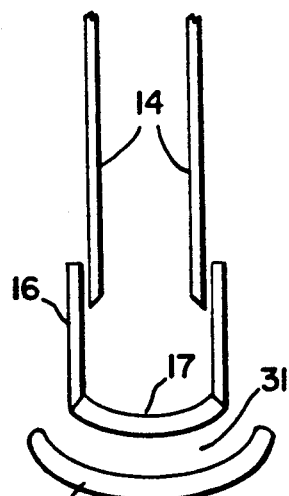

FIG. 10 illustrates the belly scraper 16 in front view. Foremost is the knife 17, which cuts the lower joint of the gills 10 and scrapes the organs into the slit 16. The belly board 22 is under the foremost part of the belly scraper 16, supporting the belly opposite the gill knife 17. Between the gill knife 17 and the belly board 22 is the gap for the belly.

Figure 11:
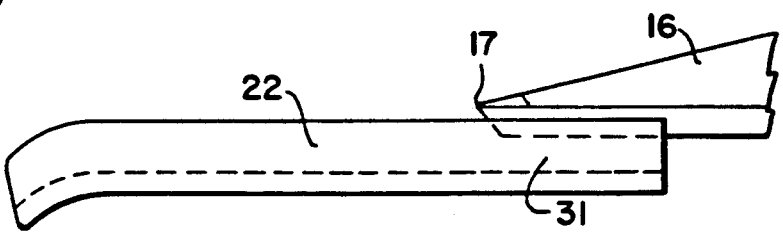

FIG. 11 illustrates in a side view the belly board 22, the gill knife 17, the gap 31 and the belly scraper 16.

Figure 12:
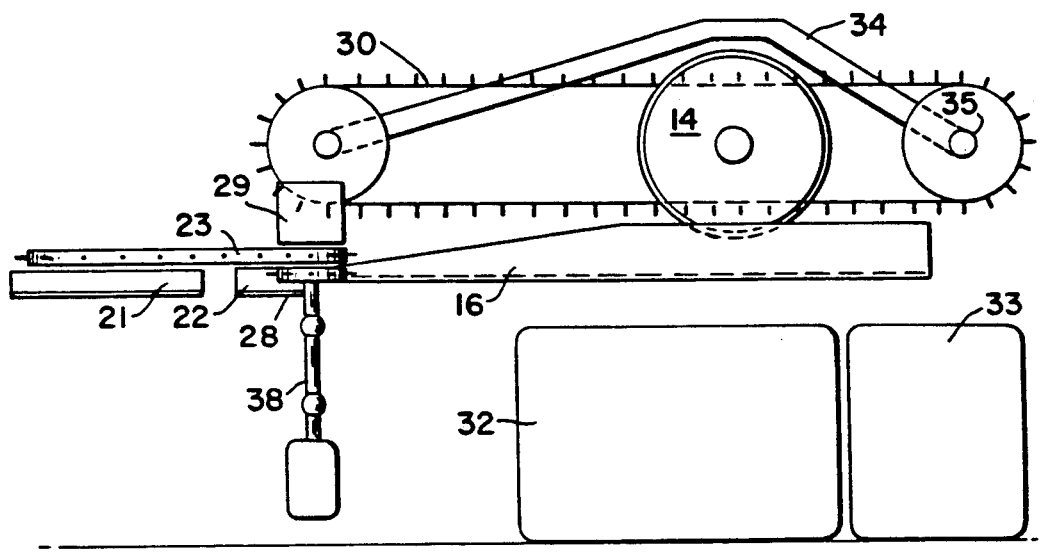
Figure 13:
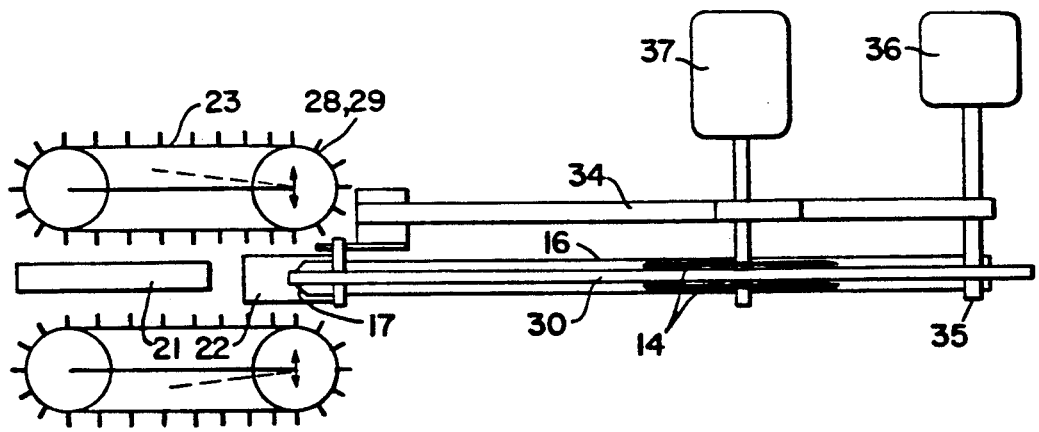

FIG. 12 illustrates a machine according to the invention in a side view and FIG. 13 from above. The front part 1 is moved by the horizontal spike chains 23 along the track 21 to the belly board 22 and to the spike wheels 28, which push the front part forward with great force opposite the knife 17. The cylinder 29 pushes the upper part of the front part into the spike chain 30, which pushes the front part along the belly scraper or the slit 16 to the knives 14, where the cheeks 25 and the belly flaps 24 are separated and fall down into a tub 32 for jam material. Thereupon the headbone 13, the spinal crest 7, the gills 10 and the organs 4, 5 and 6 are moved to the end of the belly scraper 16, where they fall down into a tub 33 for waste.

The spike chain is powered by the shaft 35 and a respective motor 36. The shafts of the spike chain 30 are through bearings connected together by the beam 34, which can pivot around the axis of shaft 35 and is connected to a spring, which pulls it towards the track, so that the chain is elastically mounted to adapt to front parts 1 of different sizes. The knives 14 are powered by motor 37, mounted upon the frame of the machine, which frame is not shown in the figures.

I claim:

1. A method for removing organs, gills, a headbone and a spine from a front part of a fish including:

moving, by horizontal spike chains at the sides of the front part, said front part with the belly forward along a straight transporting track to a belly board under said belly of the front part; continuing the movement of said front part along said transport track to a belly scraper comprising a cantilevered beam opposite the transport track and over the belly board, and being equipped with a knife at the foremost end portion and said beam which knife is opposite the lower joint of the gills and is equipped behind with a U-formed beam opposite the organs, moving the organs of the front part into the U-formed beam, cutting the lower joint of the gills by the knife, moving the gills into the U-formed beam, moving the knife and the belly scraper out through the mouth of said front part, so that the belly scraper separates from below and to the sides firstly the belly flaps and the cheeks, which are outside the belly scraper, and secondly the organs and the gills, which are inside the belly scraper.

2. A method according to claim 1, including:

moving the front part, together with the organs 4, 5 and 6 and the gills 10, inside the U-formed beam, to and past two rotating knives, which cut in the direction of motion of the front part and are at each side of the headbone and reach into the belly cavity and the mouth cavity of the front part and into the inside of the belly scraper, and cutting the headbone, the spine, gills and organs, which are inside the U-formed beam, on the one hand, from cheeks and belly flaps, which are outside the U-formed beam, on the other hand, so that cheeks and belly flaps fall down into a tub for jam material, moving headbone, spine, gills and organs forward along the U-formed beam to its end, where this waste falls down into a tub for waste.

3. Equipment for performing method according to claim 1, including a straight transport track with control and transport equipment, a cantilevered beam as a shaft in the throat of the head and two knives 14, which cut in the direction of movement, one at each side of the headbone of the front part, cut from above and into the mouth and belly, down into the shaft, and is characterized by the shaft being U-formed open beam (belly scraper) in the direction of movement opposite the lowest of the belly cavity and at the sides, so that when the front part is by the transport equipment moved along the track, the sides inside the belly cavity are moved along the outer sides of the belly scraper and the lowest side inside the cavity is moved along the base of the U-formed beam, so that the headbone and the spine, which are between the knives, and the organs and gills, which are within the U-formed beam, are cut from the cheeks and the belly flaps, which are outside the U-formed beam.

4. Equipment according to claim 3 and is characterized by a knife foremost at the lowest edge of the U-formed beam, which by the motion cuts the lower joint of the gills from the radix of the tongue.

5. Equipment according to claim 3 and is characterized by a belly board 22 under the knife 17, having a suitable gap between the knife 17 and the belly board under the knife for the thickness of the lowest part of the belly.

6. Equipment according to claim 3 and is characterized by a spiked chain 30 between the knives 14, which transports the front part forward along the track past the knife 17 and the rotating knives 14.

7. Equipment according to claim 3 and is characterized by a beam 34 between the axles of the spiked chain 30, where the beam 34 is by bearings connected to the power shaft 35 of the power wheel of the spiked chain, and can oscillate around it, and is further joined to a spring to elastically move to and from the track to adapt to front parts of different sizes.

8. Equipment according to claim 3 and is characterized by two horizontal spiked chains 23, one at each side of the front part, behind and opposite the knife 17, where the spiked chains are powered by respective motors and move the front part along the transport track in the direction of movement.

9. Equipment according to claim 3 and is characterized by elastically mounted spiked chains 23 powered by shafts from respective motors, which move front parts of different sizes along the transport track in the direction of movement.

10. Equipment according to claim 3 and is characterized by spiked wheels 28, opposite the knife 17, which press the front part past the gill knife 17.

11. Equipment according to claim 3 and is characterized by a transport track 21 for front parts, including a vertical chain and snout pushers connected to the chain by arms, which are moved along a gap in the track, where the snout pushers are formed by the nose of the fish, and the transport track is of a suitable length for more than one person feeding the machine, so that the machine can be feeded by more than one person.

12. Equipment according to claim 3 and is characterized by being placed in continuation of a machine according to patent application nr. 3596, which cuts nape muscles from a front part, so that these two machines made a unit, which separates both nape muscles, cheeks and belly flaps from a front part.

* * * * *